United States Patent
Furuichi et al.

(10) Patent No.: US 8,169,875 B2
(45) Date of Patent: May 1, 2012

(54) OPTICAL PICKUP DEVICE AND METHOD OF MANUFACTURE THEREFOR

(75) Inventors: Hiroaki Furuichi, Kawasaki (JP); Yoshio Oozeki, Yokohama (JP); Kazumi Takahashi, Toyokawa (JP); Taketoshi Moriyama, Fujisawa (JP); Hiroyasu Yoshida, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 287 days.

(21) Appl. No.: 12/420,954

(22) Filed: Apr. 9, 2009

(65) Prior Publication Data
US 2009/0323498 A1 Dec. 31, 2009

(30) Foreign Application Priority Data
Jun. 30, 2008 (JP) ................................. 2008-169801

(51) Int. Cl.
*G11B 7/00* (2006.01)

(52) U.S. Cl. ...................................... 369/100

(58) Field of Classification Search .......................... None
See application file for complete search history.

(56) References Cited

U.S. PATENT DOCUMENTS

| 7,206,273 | B2* | 4/2007 | Sogawa et al. | 369/100 |
| 2006/0239169 | A1* | 10/2006 | Marumo et al. | 369/100 |
| 2007/0183273 | A1* | 8/2007 | Arai et al. | 369/44.11 |

FOREIGN PATENT DOCUMENTS

| JP | 2002-122117 | 4/2002 |
| JP | 2002-251776 | 9/2002 |
| JP | 2004-010759 | 1/2004 |
| JP | 2006-302415 | 11/2006 |
| JP | 2007-200503 | 8/2007 |

OTHER PUBLICATIONS

Japanese Office Action dated Nov. 1, 2011 for Application No. 2008-169801.

* cited by examiner

*Primary Examiner* — Paul Huber
(74) *Attorney, Agent, or Firm* — Antonelli, Terry, Stout & Kraus, LLP.

(57) ABSTRACT

An optical pickup device includes a holder which holds an LD and a light-receiving element and an optical pickup case on which the holder is adhesively fixed via an ultraviolet cure adhesive, and is provided with a through hole on a bonding surface of the holder in order to reduce shrinkage when ultraviolet light is irradiated and to form a blind portion on which the ultraviolet light is not irradiated from a specific direction for adhesively fixing with high position accuracy.

12 Claims, 4 Drawing Sheets

OPTICAL PICKUP DEVICE AND METHOD OF MANUFACTURE THEREFOR

INCORPORATION BY REFERENCE

The present application claims priority from Japanese application JP2008-169801 filed on Jun. 30, 2008, the content of which is hereby incorporated by reference into this application.

FIELD OF THE INVENTION

The present invention relates to an optical pickup device which is used for recording and reproducing of an optical disk such as a CD (compact disk), a DVD (digital versatile disk), and a BD (blue ray disk), or an optical disk drive apparatus in which the optical pickup device is built, and in particular, to a technique of adhesively fixing an element such as a laser diode and a light-receiving element.

DESCRIPTION OF RELATED ART

An optical pickup device used for recording and reproducing of an optical disk, or an optical disk drive apparatus in which the optical pickup device is built, is configured to include an optical system in which an output light emitted from a laser diode (hereinafter, refer to as an LD) is guided to an object lens through various kinds of lenses, a prism, a reflection mirror and the like, and is converged on the optical disk, and an optical system in which light reflected from the optical disk is formed as an image on a light-receiving element through the object lens and the reflection mirror, the prism, various kinds of lenses and the like. In this configuration, it is necessary to optically adjust the LD and the light-receiving element to be located at an optimum position and then fixed on a case of the optical pickup device. For this reason, in general, the LD and the light-receiving element are once bonded to a holder having a suitable shape for adhesion with the case, and the holder is optically adjusted to be located at the optimal position of the case. Then, using an ultraviolet (UV) cure adhesive, the holder is fixed at a three-dimensional position within a thickness of an adhesive layer.

Here, due to characteristics of a variety of optical components and deviation in assembled position, a gap between the holder, on which the LD or the light-receiving element is fixed, and the case, that is, the thickness of the adhesive layer may be about 1 mm at the maximum. For this reason, shrinkage in the adhesive during curing at the time of irradiating the ultraviolet light cannot be ignored, and there is a problem in that misalignment in an optical axis becomes larger. Therefore, a technique of adhesively fixing the holder which is able to suppress positional misalignment caused by the deformation of the adhesive even when a bonding gap between the holder and the case is large becomes necessary.

For example, JP-A-2002-251776 discloses a structure in which notched portions are formed by notching the both sides of a mounting plate of an optical detector, respectively, which prevents a blind of ultraviolet irradiation for curing an adhesive from occurring. In addition, on a surface on which the notched portion is bonded, grooves are formed in parallel to a surface direction of the mounting plate. Therefore, a misplacement direction of the adhesive is set to the direction of the grooves.

JP-A-2004-10759 discloses a structure in which protrusions are formed on one of a first member and a second member, connection portions disposed close to the protrusions are formed on the other member, so that a position of the protrusion is adjustable in a height direction thereof. By applying and curing the adhesive on these protrusions and the connection portions, it is possible to adhesively fix the first member and the second member via a predetermined gap even though the adhesive is not applied to be thicker.

JP-A-2006-302415 discloses a feature in which a light-emitting element or a light-receiving element is adhesively fixed on a frame by the adhesive which contains a thermal-conductive filler excellent in thermal conductivity. Therefore, a radiation effect can be improved and the shrinkage in the adhesive during curing and the shrinkage in the adhesive over time can be suppressed.

In the above-mentioned conventional techniques, with regard to JP-A-2002-251776, it is necessary to form the groove on the bonding surface which is provided on the both sides of the main body, and with regard to JP-A-2004-10759, it is necessary to provide protrusions on the both sides of the main body. In addition, in JP-A-2006-302415, when the optical pickup device is made to be thinner, an adhesive length becomes shorter in a thickness direction. Therefore, it is difficult to secure an adhesive strength because the optical pickup device is susceptible to bending moment in the thickness direction.

As described above, it is particularly difficult to make the thickness of the entire adhesive portion between the members, that is, the thickness of the optical pickup device to be thinner. In addition, it may also be difficult to reduce a lateral width of the entire adhesive portion between the members.

BRIEF SUMMARY OF THE INVENTION

An object of the present invention is to provide an optical pickup device having a structure for adhesive fixation and a method of manufacture therefor, which can decrease an effect of misalignment of an optical axis caused by shrinkage in the adhesive during curing independently of the existence of the groove or the protrusion, and which can secure the adhesive strength while reducing the misalignment in the optical axis even when being made thin.

In order to achieve the above object, according to the present invention, when the holder which holds the LD or the light-receiving element is adhesively fixed on an optical pickup case via the ultraviolet cure adhesive, a penetration structure is provided between the bonding surface of the holder which holds the LD or the light-receiving element and a surface other than the bonding surface, and an adhesive is filled between the holder and the optical pickup case and in a part of the penetration structure. Then, the adhesive is sequentially cured to be fixed by the ultraviolet light.

As described above, according to the present invention, when the holder which holds the LD or the light-receiving element is adhesively fixed on the optical pickup case via the ultraviolet cure adhesive, it is possible to reduce the shrinkage in the adhesive during curing and the holder can be adhesively fixed on the optical pickup case with high position accuracy and with high adhesive strength. Therefore, the misalignment in the optical axis of the optical pickup device can be reduced, and a yield ratio can be improved in the assembly processes. In addition, it is possible to correspond to manufacture of a thin optical pickup device or a high-performance optical pickup device, each of which has a strict specification on the assembly accuracy or the bonding strength.

Other objects, features and advantages of the invention will become apparent from the following description of the embodiments of the invention taken in conjunction with the accompanying drawings.

BRIEF DESCRIPTION OF SEVERAL VIEWS OF DRAWINGS

FIGS. 3A to 3D are views illustrating a main portion according to the first embodiment of the present invention.

DETAILED DESCRIPTION OF THE INVENTION

Embodiments of the present invention will be described with reference to the accompanying drawings.

Embodiment 1

Figure 1:
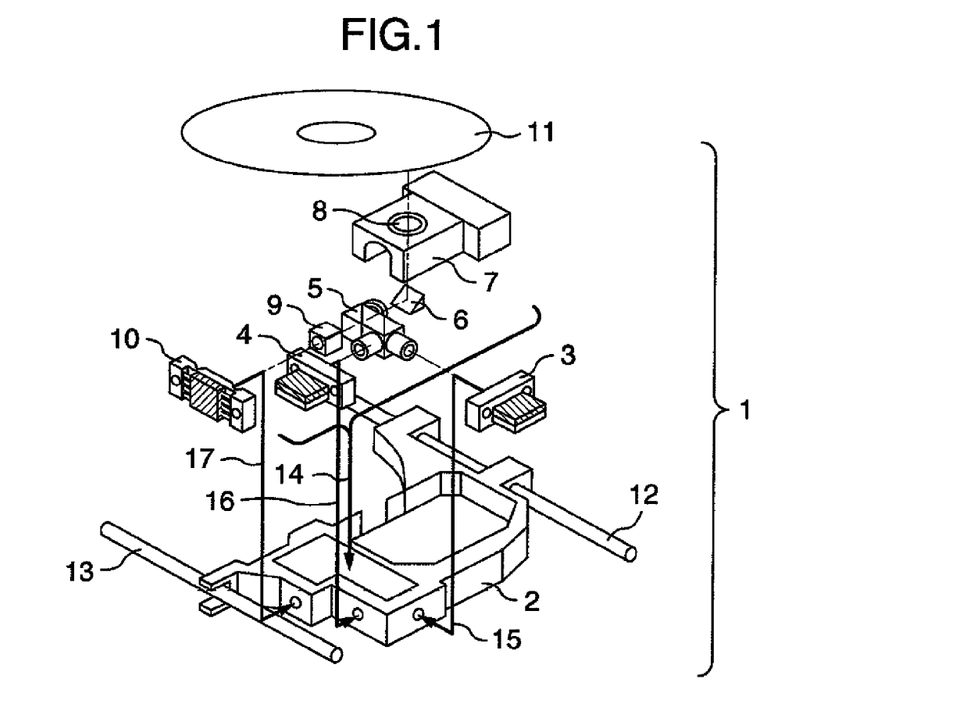
FIG. 1 is an expanded perspective view illustrating an optical pickup device according to a first embodiment of the present invention.
Figure 2:
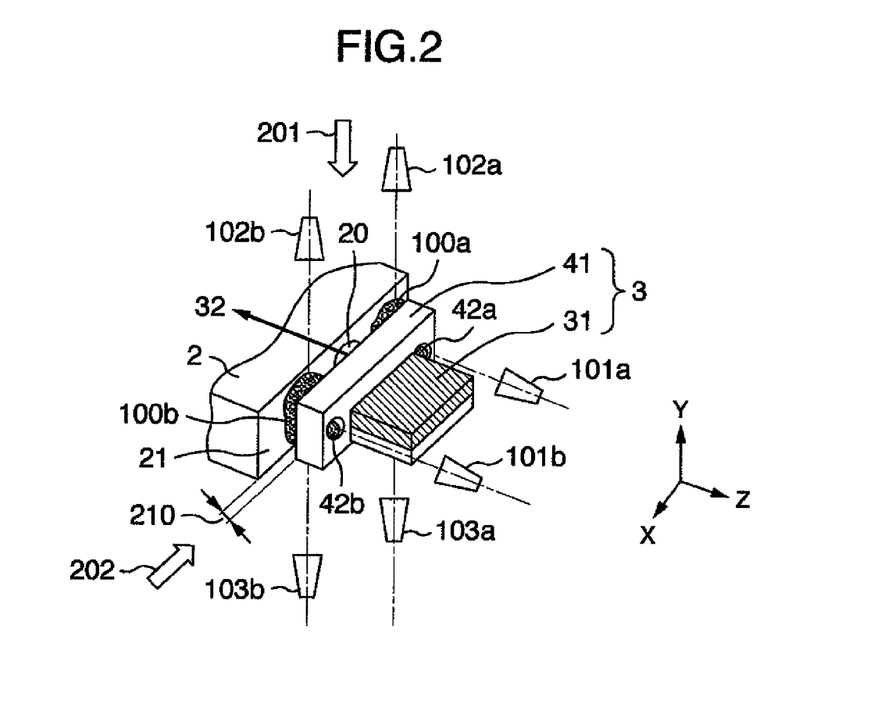
FIG. 2 is a perspective view illustrating an assembly state of an LD module according to the first embodiment of the present invention.

First, a first embodiment of the present invention will be described. FIG. 1 is an expanded perspective view illustrating component parts and an assembly method of the optical pickup device 1 to which the first embodiment of the present invention is applied. FIG. 2 is a perspective view illustrating an assembly state of the optical pickup device 1 to which an LD module 3 shown in FIG. 1 is attached. As shown in FIG. 1, the optical pickup device 1 according to the present embodiment includes an optical pickup case 2, the LD module 3, an LD module 4, a prism 5, a reflection mirror 6, an actuator 7, an object lens 8, a lens 9, and a light-receiving element module 10.

In the configuration of the optical pickup device 1 described above, output lights from the LD modules 3 and 4 are mixed or reflected by the prism 5, are guided via the reflection mirror 6 to the object lens 8 which is disposed on the actuator 7, and are converged into a spot on an optical disk 11. The reflected light from the optical disk 11 travels via the object lens 8, the reflection mirror 6, the prism 5, and the lens 9 to form an image on the light-receiving element 10.

In order to realize the above-mentioned optical system, in the optical pickup case 2, internal parts such as the actuator 7, the reflection mirror 6, the prism 5, the lens 9 and the like are mounted along an assembly direction 14, and then the LD module 3, the another LD module 4, and the light-receiving element module 10 are adhesively fixed along an assembly direction 15, an assembly direction 16, and an assembly direction 17 after the position adjustment, respectively. In addition, the optical pickup device 1 is configured to move in a radial direction of the rotating optical disk by a primary axis 12 and a secondary axis 13 and to be able to read and write optical signals.

The assembly state of the main portions of the present invention will be described by using the LD module 3 (referring to FIG. 2 and FIG. 3). Since the LD modules 3 and 4 have the same bonding structure as that of the light-receiving element module 10, the present invention is also applicable to the light-receiving element module 10 as in the case of the LD modules 3 and 4.

In the LD module 3, an LD 31 is fixed to a holder 41 in advance by using a thermosetting adhesive or the like in order to easily bond the LD module on the optical pickup case 2, and holder through holes 42a and 42b are provided on both sides of the holder 41. While the LD module 3 emits a laser light 32 from the LD 31 to a hole 20 along the optical axis of the case which is formed in the optical pickup case 2 (power feeding method is not shown), it is aligned with respect to a gap between the optical pickup case 2 and the LD module 3 in the Z direction, with respect to an optimum position in the XY plane and with respect to an optimum degree of an inclination angle. After alignment, the gap 210 between the optical pickup case 2 and the LD module 3 is made wider, and ultraviolet curing adhesives 100a and 100b are applied on two places of the bonding surface 21 of the optical pickup case 2 by a defined amount. Then, the gap 210 is returned to the aligned position. As shown in the plan sectional view of FIG. 3A which is viewed in an observation direction 201 of the Y axis shown in FIG. 2, the adhesives 100a and 100b are spread out, and the adhesives are also entered into the holder through holes 42a and 42b, which are provided at the both sides on the holder 41, in a positive direction of the Z axis. Thereafter, the adhesives 100a and 100b are cured by UV irradiation 101a, 101b.

Figure 3A:
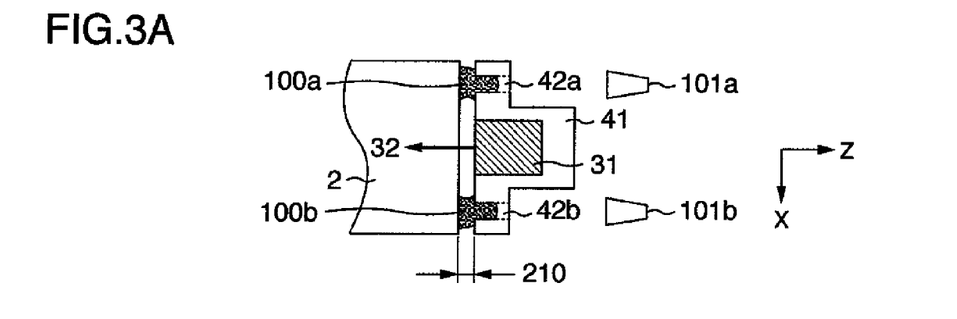
FIG. 3A is a front view and FIGS. 3B to 3D are side views.
Figure 3B:
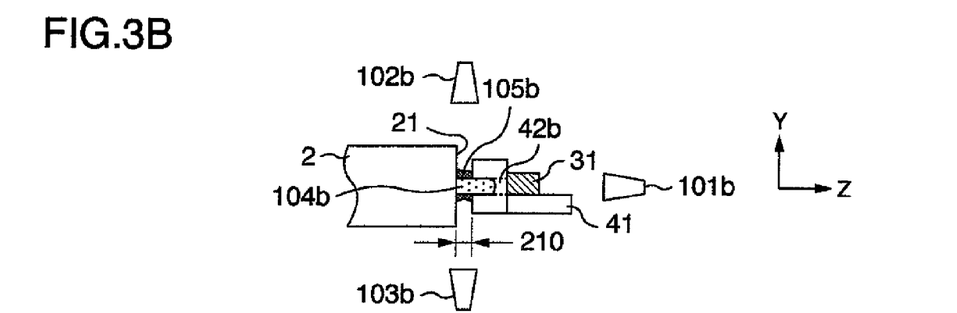
Figure 3C:
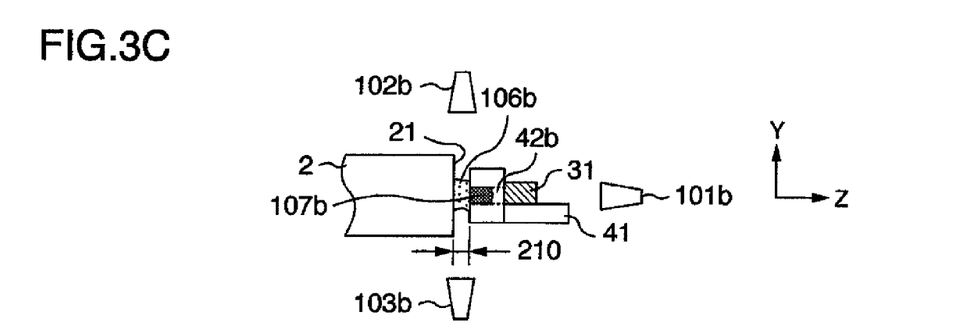
Figure 3D:
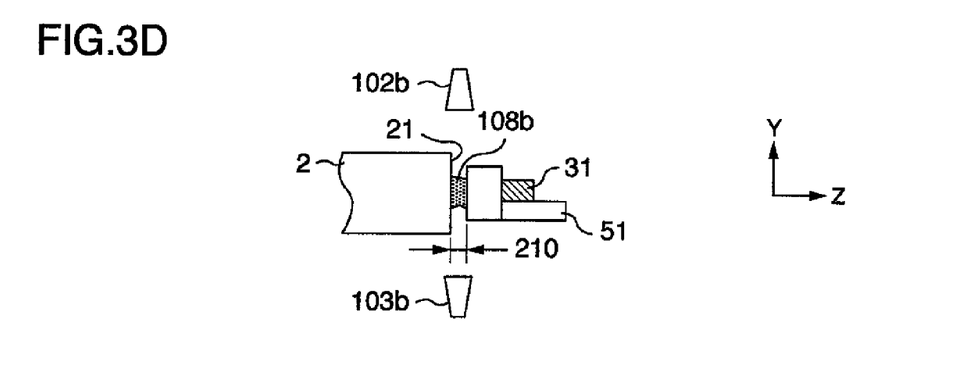

Here, as shown in the sectional side view of FIG. 3D which is viewed in an observation direction 202 of the X axis shown in FIG. 2, in a case where a holder 51 without through hole which has been commercially available is used instead of the holder 41 having the holder through hole, curing behavior at the time of the UV irradiation will be described first. In addition, in the following descriptions, when it is viewed in the observation direction of the X axis, only the adhesive 100b positioned in the positive direction of the X axis is described. However, since the adhesive 100a positioned in the negative direction of the X axis is the same as that in the positive direction of the X axis, an explanation thereof will be omitted.

When the UV irradiation 102b from above in the Y direction and the UV irradiation 103b from below in the Y direction are carried out at the same time, the adhesive 108b begins to be cured from the surface thereof. For this reason, since the surface is cured even though a liquid portion remains in the center portion of the adhesive 108b, the shrinkage in the adhesive during curing (volume shrinkage) cannot be absorbed and the gap 210 shrinks in the Z direction. For example, in a case where the gap 210 is about 0.5 mm, the shrinkage occurs in the Z direction by an amount of 0.01 mm corresponding to about 2%. Since there is an unbalance caused by the deviation in application position and application amount at two places of the adhesives 100a and 100b in the X direction, when the adhesive shrinks in the Z direction, the position in the X direction or the Y direction is easily displaced.

In the first embodiment of the present invention, there are two manners available for the UV irradiation. As a first manner, as shown in the sectional side view of FIG. 3B, the UV irradiation is carried out in the Z direction at the first time, and then the UV irradiation is carried out from above and from below in the Y direction at the same time. First, when the UV irradiation 101b is carried out in the negative direction of the Z axis, the curing proceeds gradually in the negative direction of the Z axis from the adhesive in the holder through hole 42b up to the bonding surface 21 of the optical pickup case 2, and thus a cured adhesive portion 104b is formed. In this case, since the curing proceeds sequentially from one side in a state of coming into contact with an uncured adhesive portion 105b, the shrinkage in the adhesive during curing is absorbed by the deformation caused by the flowability of the uncured portion. Therefore, an amount of the shrinkage in the gap 210 is reduced. Next, when the UV irradiation 102b from above in the Y direction and the UV irradiation 103b from below in the Y direction are carried out at the same time, the uncured adhesive portion 105b is cured from the outer peripheral side thereof. In this case, the cured adhesive portion 104b serves as a pillar to prevent the gap 210 from deviation, and thus the shrinkage in the gap 210 hardly occurs.

In the first UV irradiation manner described above, for example, when the gap 210 is about 0.5 mm and filled with the same adhesive described above, the total amount of the shrinkage in the gap 210 is suppressed within about 1% or less in the Z direction.

As a second manner, as shown in the sectional side view of FIG. 3C, first, the UV irradiation is carried out from above and from below in the Y direction at the same time, and then the UV irradiation is carried out in the Z direction. First, when the UV irradiation 102b from above in the Y direction and the UV irradiation 103b from below in the Y direction are carried out at the same time, the curing proceeds up to only a portion of the gap 210 where the UV is irradiated on the adhesive, and the portion becomes an cured adhesive portion 106b. In this case, the shrinkage in the adhesive during curing is absorbed by the flowability of an uncured adhesive portion 107b in the holder through hole 42b. Therefore, the amount of the shrinkage in the gap 210 is reduced. Next, when the UV irradiation 101b is carried out in the negative direction of the Z axis, the uncured adhesive portion 107b in the holder through hole 42b is gradually cured in the negative direction of the Z axis, and thus the uncured portion disappears.

In the second UV irradiation manner described above, for example, when the gap 210 is about 0.5 mm and filled with the same adhesive described above, the total amount of the shrinkage in the gap 210 is suppressed within about 1% or less in the Z direction.

As described above, as manners of curing the adhesive between the holder 41 and the surface 21 of the optical pickup case 2, 1) a manner of curing the adhesive from the center portion thereof by the UV light without curing the adhesive from the outer peripheral side thereof, and 2) a manner of curing the adhesive from the outside thereof by the UV light while remaining the uncured portion in a portion connecting to the center of the adhesive are valid. In these manners, the shrinkage in the adhesive during the UV curing can be effectively reduced to ½ of that in the case where the adhesive is simultaneously cured from the entire outside thereof by the UV light. That is, in the UV curing for the first time, the holder 41 is used as a mask (ultraviolet screening member) so as to form a blind portion against the UV irradiation, and thus the effects of the positional misalignment and the angular misalignment are suppressed. Finally, in order to completely cure the blind portion, the holder through holes 42a and 42b are provided in the holder 41, for example. According to such a configuration, since the adhesive is filled up to a part in the holder through holes 42a and 42b of the holder 41, a bonding area becomes wider, and it becomes effectively resistant against the bending moment in the thickness direction (Y direction).

Figure 4:
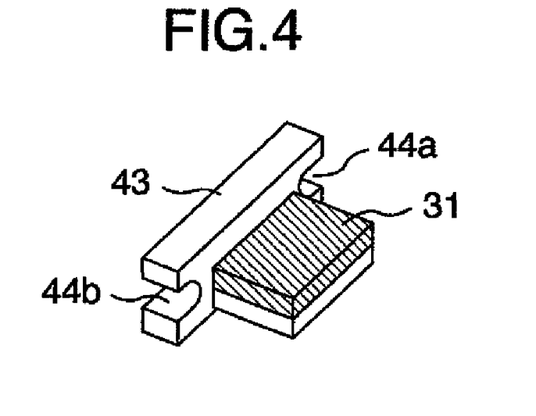
FIG. 4 is a perspective view illustrating another structure of the main portion according to the first embodiment of the present invention.
Figure 5:
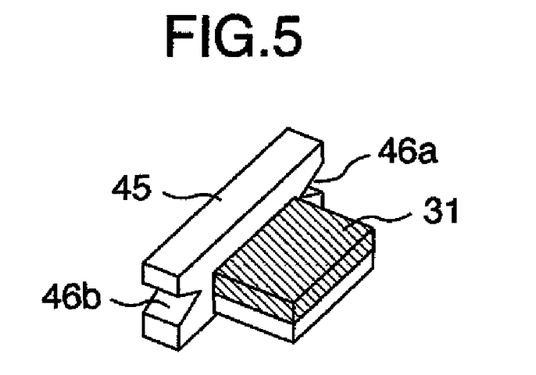
FIG. 5 is a perspective view illustrating another structure of the main portion according to the first embodiment of the present invention.
Figure 6:
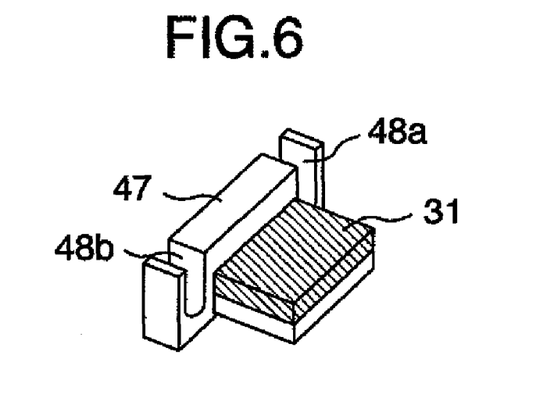
FIG. 6 is a perspective view illustrating another structure of the main portion according to the first embodiment of the present invention.

Further, in the present embodiment, the holder through holes 42a and 42b are adopted as forming means of the blind portion at the time of the UV irradiation. However, the same effect can be obtained in the U-shaped grooves 44a and 44b formed at the side surfaces of the holder as shown in FIG. 4 or in the V-shaped grooves 46a and 46b formed at the side surfaces of the holder 45 as shown in FIG. 5. In addition, as shown in FIG. 6, the U-shaped grooves 48a and 48b formed at the top surface of the holder can provide the same effect as that of the holder through holes 42a and 42b if an open portion of the U-shaped grooves formed at the top surface is configured to be shielded by a holding claw portion of a positioning jig (not shown) which holds the holder 47.

Further, the ultraviolet (UV) cure adhesives 100a and 100b are preferably an ultraviolet cure adhesive of an acrylic type or an epoxy type. However, in order to completely cure the uncured portion by the previous UV irradiation, the ultraviolet (UV) cure adhesive of the thermosetting hybrid type may be used. In addition, it is also possible to use an adhesive added with a thermally-conductive filler which can increase thermal conductivity even though the adhesive strength is relatively easy to be decreased.

Embodiment 2

Figure 7:
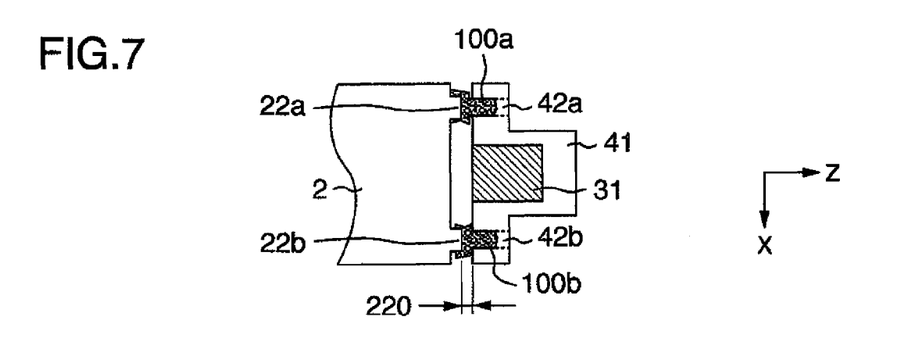
FIG. 7 is a plan sectional view illustrating a main portion according to a second embodiment of the present invention.

FIG. 7 is a plan sectional view illustrating a case where the holder 41 having the holder through holes 42a and 42b is bonded with the optical pickup case 2 via case convex surfaces 22a and 22b which are provided on the bonding surface of the optical pickup case 2. Similar to the above-mentioned embodiment, after alignment, the gap 220 between the case convex surfaces 22a and 22b of the optical pickup case 2 and the holder 41 becomes wider, and ultraviolet cure adhesives 100a and 100b are applied on two places of the case convex surfaces 22a and 22b of the optical pickup case 2 by a defined amount. Then, the gap 220 is returned to the alignment position. The adhesives 100a and 100b are spread out to be a state where the adhesives enter into the holder through holes 42a and 42b, which are provided at the both sides of the holder 41, in the positive direction of the Z axis. In addition, the adhesives which are spread out from the case convex surfaces 22a and 22b are widely applied on the roots of the convex surfaces (negative direction of the Z axis shown in FIG. 7) so as to form fillets. Then, using any one of the UV irradiations of the two manners described above, the adhesives 100a and 100b are cured. Here, it is preferable that the amount of the adhesive to be applied should be controlled such that unfilled portions of the adhesives remain in the holder through holes 42a and 42b, respectively. This is because, when the adhesives protrude from the positive direction of the Z axis of the holder through holes 42a and 42b without the unfilled portions of the adhesives, the uncured adhesives in the holder through holes 42a and 42b are cured from the both sides thereof at the time of the UV irradiation from above and from below in the Y direction in the second UV irradiation manner described above, so that the effect of absorbing the deformation by the flowability of the uncured adhesive portion in the holder through holes 42a and 42b is reduced.

In the present manner, similar to the embodiments described above, the effect of the shrinkage in the adhesive during the UV curing can be reduced to ½ of that in the case where the adhesive is simultaneously cured from the entire outside thereof by the UV light. In addition, since the fillets of the adhesives are formed on the case convex surfaces 22a and 22b, it is further resistant against the bending moment in the thickness direction (Y direction), so that the bonding strength becomes further strong. Further, since the adhesives are applied on two places of the case convex surfaces 22a and 22b by a defined amount, it is easy to determine the application positions.

Embodiment 3

Figure 8:
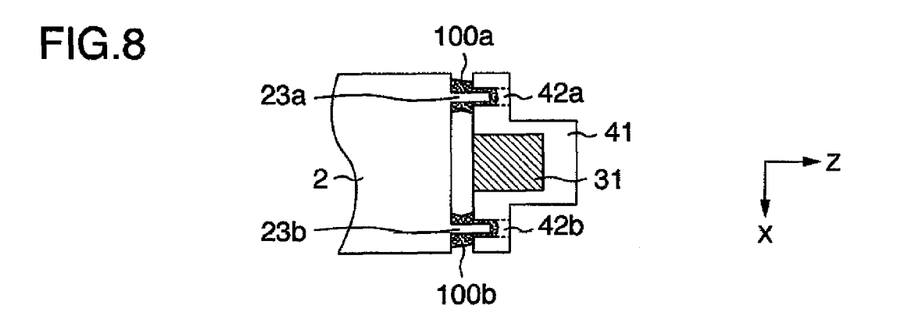
FIG. 8 is a plan sectional view illustrating a main portion according to a third embodiment of the present invention.

FIG. 8 is a plan sectional view illustrating a case where the holder 41 having the holder through holes 42a and 42b is bonded with the optical pickup case 2 via case protrusions 23a and 23b which are provided on the bonding surface of the optical pickup case 2. Similar to the above-mentioned embodiment, after alignment, the gap between the case protrusions 23a and 23b of the optical pickup case 2 and the holder 41 becomes wider, and ultraviolet cure adhesives 100a and 100b are applied on two places of the case protrusions 23a and 23b of the optical pickup case 2 by a defined amount. Then, the gap is returned to the aligned position. The adhesives 100a and 100b are spread out to be a state where the adhesives enter into the holder through holes 42a and 42b, which are provided at the both sides of the holder 41, in the positive direction of the Z axis. Then, using any one of the UV irradiations of the two manners described above, the adhesives 100a and 100b are cured. Here, as described above, it is preferable that the amount and the position of the adhesive to be applied should be controlled such that unfilled portions remain in the holder through holes 42a and 42b, respectively.

In the present manner, similar to the embodiments described above, the shrinkage in the adhesive during the UV curing can be effectively reduced to ½ of that in the case where the adhesive is simultaneously cured from the entire outside thereof by the UV light. In addition, since the case protrusions 23a and 23b are adhesively fixed in the holder through holes 42a and 42b, it is further resistant against the bending moment in the thickness direction (Y direction), so that the bonding strength becomes further larger.

Embodiment 4

Figure 9:
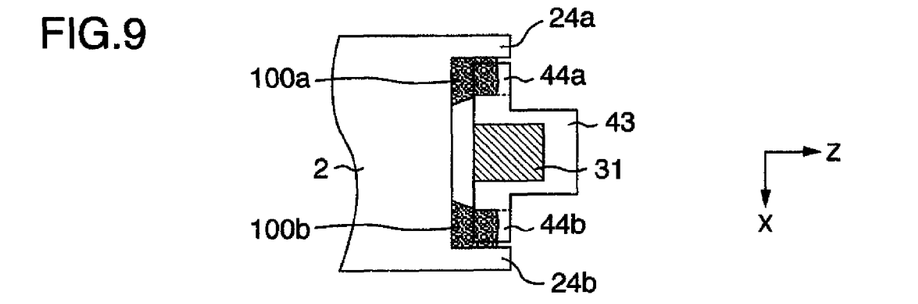
FIG. 9 is a plan sectional view illustrating a main portion according to a fourth embodiment of the present invention.

FIG. 9 is a plan sectional view illustrating a case where the holder 43 having U-shaped grooves 44a and 44b formed at the side surfaces of the holder is bonded with the optical pickup case 2 via case-side-surface extending portions 24a and 24b which are provided on the bonding surface of the optical pickup case 2. Similar to the above-mentioned embodiment, after alignment, the gap between the case-side-surface extending portions 24a and 24b of the optical pickup case 2 and the holder 43 becomes wider, and ultraviolet cure adhesives 100a and 100b are applied on two places of the case-side-surface extending portions 24a and 24b of the optical pickup case 2 by a defined amount. Then, the gap is returned to the aligned position. The adhesives 100a and 100b are spread out to be a state where the adhesives enter into the U-shaped grooves 44a and 44b formed at the both side surfaces of the holder 43 in the positive direction of the Z axis. Then, using any one of the UV irradiations of the two manners described above, the adhesives 100a and 100b are cured. Here, as described above, it is preferable that the amount and the position of the adhesive to be applied should be controlled such that unfilled portions remain in the U-shaped grooves 44a and 44b formed at the side surfaces of the holder, respectively.

In the present manner, similar to the embodiments described above, the shrinkage in the adhesive during the UV curing can be effectively reduced to ½ of that in the case where the adhesive is simultaneously cured from the entire outside thereof by the UV light. In addition, since the case-side-surface extending portions 24a and 24b are adhesively fixed in the U-shaped grooves 44a and 44b formed at the side surfaces of the holder, it is further resistant against the bending moment in the thickness direction (Y direction), so that the bonding strength becomes further larger.

Embodiment 5

Figure 10:
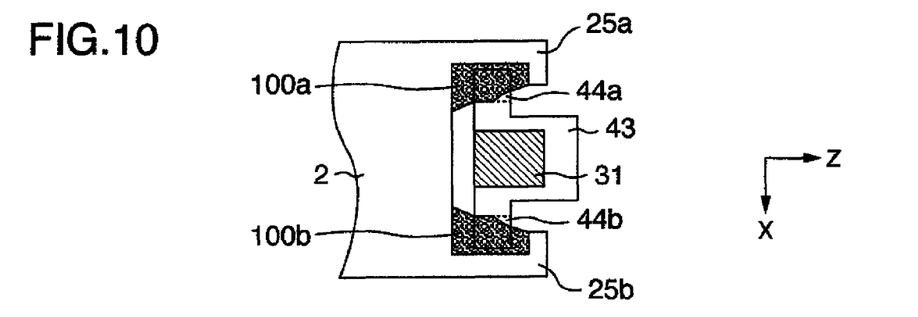
FIG. 10 is a plan sectional view illustrating a main portion according to a fifth embodiment of the present invention.

FIG. 10 is a plan sectional view illustrating a case where the holder 43 having U-shaped grooves 44a and 44b formed at the side surfaces of the holder is bonded with the optical pickup case 2 via case-side-surface extending enclosure portions 25a and 25b which are provided on the both sides of the bonding surface of the optical pickup case 2. Similar to the above-mentioned embodiment, after alignment, the gap between the case-side-surface extending enclosure portions 25a and 25b of the optical pickup case 2 and the holder 43 becomes wider, and ultraviolet cure adhesives 100a and 100b are applied on two places of the case-side-surface extending enclosure portions 25a and 25b of the optical pickup case 2 by a defined amount. Then, the gap is returned to the aligned position. The adhesives 100a and 100b are spread out to be a state where the adhesives enter into the U-shaped grooves 44a and 44b formed at the both side surfaces of the holder 43 in the positive direction of the Z axis. Then, using any one of the UV irradiations of the two manners described above, the adhesives 100a and 100b are cured. Here, as described above, it is preferable that the amount and the position of the applying adhesive be controlled such that unfilled portions remain in the U-shaped grooves 44a and 44b formed at the side surfaces of the holder, respectively.

In the present manner, similar to the embodiments described above, the shrinkage in the adhesive during the UV curing can be effectively reduced to ½ of that in the case where the adhesive is simultaneously cured from the entire outside thereof by the UV light. In addition, since the case-side-surface extending enclosure portions 25a and 25b are adhesively fixed in the U-shaped grooves 44a and 44b formed at the side surfaces of the holder, it becomes further resistant against the bending moment in the thickness direction (Y direction), so that the bonding strength is further larger. Further, since of the U-shaped grooves 44a and 44b formed at the side surfaces of the holder are adhesively fixed on the both sides of the positive direction side of the Z axis and the negative direction side of the Z axis, the shrinkage in the adhesive during curing is effectively canceled from the both sides of the positive direction side of the Z axis and the negative direction side of the Z axis. In addition, the shrinkage in the adhesive during the UV curing can be effectively further reduced. Therefore, the misalignment of the optical axis can be effectively reduced.

The LD and the light-receiving element are main parts because the misalignments of the positions and the angles thereof largely affect the misalignment of the optical axis in comparison with other optical parts. For this reason, the technique of adhesively fixing the optical pickup case and the LD or the light-receiving element by interposing a thick adhesive layer therebetween with high position accuracy is an important technique which can increase the assembly accuracy and leads to realization of the high process yield and the high reliability. In addition, as the performance of the optical pickup device is increased and the thickness thereof is reduced, the required specification on the assembly accuracy and the bonding strength becomes strict. Therefore, by using the present technique, it is possible to correspond to the high performance of the optical pickup device and the reduced thickness thereof.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of manufacturing an optical pickup device comprising:
   a preparing step of preparing:
      an optical pickup case,
      a holder configured to hold at least one of a laser diode and a light-receiving element, and configured to have a penetration structure on a bonding surface facing the optical pickup case, the penetration structure configured so as to be penetrated up to a surface other than the bonding surface, and
      an ultraviolet cure adhesive, either with or without a thermally-conductive filler, disposed between the holder and the optical pickup case;
   a first curing step of irradiating ultraviolet light to an inner portion of said ultraviolet cure adhesive through said penetration structure provided in said holder, so as to cure an inner portion of said ultraviolet cure adhesive without curing an outer portion of said ultraviolet cure adhesive; and
   a second curing step performed after said first curing step, of curing an outer portion of said ultraviolet cure adhesive which was not cured in the first curing step.

2. The method of manufacturing the optical pickup device according to claim 1,
   wherein a curing by ultraviolet irradiation is carried out in said second curing step.

3. The method of manufacturing the optical pickup device according to claim 1,
   wherein said penetration structure provided in the bonding surface of said holder is penetrated up to a surface opposite to the bonding surface.

4. The method of manufacturing the optical pickup device according to claim 1,
   wherein the penetration structure provided on the bonding surface of said holder is a groove provided on a side surface of said holder, and is configured to be penetrated from the bonding surface up to a surface opposite to said adhesive surface.

5. The method of manufacturing the optical pickup device according to claim 1,
   wherein said ultraviolet cure adhesive has a thermally-conductive filler, and a thermal curing is carried out in said second curing step.

6. The method of manufacturing the optical pickup device according to claim 1,
   wherein during the first curing step, shrinkage of the cured portion of said ultraviolet cure adhesive is absorbed by a deformation caused by the flowability of the uncured portion, thereby helping to prevent misalignment or displacement of the holder due to the shrinkage of the cured portion of said ultraviolet cure adhesive.

7. A method of manufacturing an optical pickup device comprising:
   a preparing step of preparing:
      an optical pickup case,
      a holder configured to hold at least one of a laser diode and a light-receiving element, and configured to have a penetration structure on a bonding surface facing the optical pickup case, the penetration structure configured so as to be penetrated up to a surface other than the bonding surface, and
      an ultraviolet cure adhesive, either with or without a thermally-conductive filler, disposed between the holder and the optical pickup case;
   a first curing step of curing an outer portion of said ultraviolet cure adhesive, without curing said ultraviolet cure adhesive in said penetration structure of said holder, by irradiating ultraviolet light to said ultraviolet cure adhesive but not into said penetration structure of said holder; and
   a second curing, performed after said first curing step, to cure said ultraviolet cure adhesive in said penetration structure of said holder, which was not cured in said first curing step.

8. The method of manufacturing the optical pickup device according to claim 7,
   wherein during the first curing step, shrinkage of the cured portion of said ultraviolet cure adhesive is absorbed by a deformation caused by the flowability of the uncured portion, thereby helping to prevent misalignment or displacement of the holder due to the shrinkage of the cured portion of said ultraviolet cure adhesive.

9. A method of manufacturing an optical pickup device comprising:
   a preparing step of preparing:
      a holder configured to hold at least one of a laser diode and a light-receiving element,
      an optical pickup case, and
      an ultraviolet cure adhesive, either with or without a thermally-conductive filler, disposed between the holder and the optical pickup case;
   a first curing step of curing a first portion of said ultraviolet cure adhesive, by irradiating ultraviolet light through a penetration structure provided on said holder to said first portion of ultraviolet cure adhesive, thereby using said holder as a mask so that a second portion of said ultraviolet cure adhesive is not cured; and
   a second curing step performed after said first curing step, of curing the second portion of said ultraviolet cure adhesive which was not cured in said first curing step.

10. A method of manufacturing an optical pickup device, comprising
    a preparing step of preparing:
       a holder configured to hold at least one of a laser diode and a light-receiving element,
       an optical pickup case, and
       an ultraviolet cure adhesive, either with or without a thermally-conductive filler, disposed between the holder and the optical pickup case;
    a first curing step of curing a first portion of said ultraviolet cure adhesive, by irradiating ultraviolet light to said ultraviolet cure adhesive using said holder as a mask; and
    a second curing step performed after said first curing step, of curing a second portion of said ultraviolet cure adhesive that was not cured in said first curing step,
    wherein the holder has a penetration structure,
    wherein said second portion of said ultraviolet cure adhesive is extended into said penetration structure, and
    wherein, in said first curing step, said ultraviolet irradiation is performed in a manner that said second portion of said ultraviolet cure adhesive in said penetration structure is not cured.

11. A method of manufacturing an optical pickup device comprising:
   a preparing step of preparing:
      a holder configured to hold at least one of a laser diode and a light-receiving element, and configured to have a penetration structure,
      an optical pickup case, and
      an ultraviolet cure adhesive, either with or without a thermally-conductive filler, disposed between the holder and the optical pickup case and in the penetration structure;
   a first curing step of curing said ultraviolet cure adhesive, in a manner that an outer portion of said ultraviolet cure adhesive is not cured, by irradiating ultraviolet light on said ultraviolet cure adhesive through said penetration structure of said holder; and
   a second curing step performed after said first curing step, of curing said outer portion of ultraviolet cure adhesive which was not cured in said first curing step.

12. A method of manufacturing an optical pickup device comprising:
   a preparing step of preparing:
      a holder configured to hold at least one of a laser diode and a light-receiving element, and configured to have a penetration structure,
      an optical pickup case, and
      an ultraviolet cure adhesive, either with or without a thermally-conductive filler, disposed between said holder and said optical pickup case and in said penetration structure;
   a first curing step of curing said ultraviolet cure adhesive by irradiating ultraviolet light to said ultraviolet cure adhesive from a side surface of said holder, such that a portion of said ultraviolet cure adhesive which is in said penetration structure is not cured; and
   a second curing step performed after said first curing step, of curing said portion of said ultraviolet cure adhesive in said penetration structure which was not cured in said first curing step.

* * * * *